United States Patent [19]

Sridhar et al.

[11] 4,046,746

[45] Sept. 6, 1977

[54] METHOD FOR EXTRACTING GRANULAR POLYAMIDES AND FOR PREPARING POLYAMIDE POWDERS

[75] Inventors: Srinivasan Sridhar; Horst Hedden, Marl, Germany

[73] Assignee: Chemische Werke Huls Aktiengesellschaft, Marl, Germany

[21] Appl. No.: 592,036

[22] Filed: June 30, 1975

[30] Foreign Application Priority Data

July 19, 1974 Germany .......................... 2434755
July 19, 1974 Germany .......................... 2434756

[51] Int. Cl.² .......................................... C08G 69/46
[52] U.S. Cl. ................................. 260/78 S; 260/78 L
[58] Field of Search ............ 260/78 S, 78 SC, 78 R, 260/857 TW

[56] References Cited

FOREIGN PATENT DOCUMENTS 1,201,986 9/1965 Germany

*Primary Examiner*—Harold D. Anderson
*Attorney, Agent, or Firm*—Gilbert L. Wells

[57] ABSTRACT

A method for extracting granular polyamides having at least 10 aliphatically bound carbon atoms per carbonamide group and a method for preparing polyamide powders from the extracted granular polyamides. The granular polyamides are extracted with dimethyl formamide at temperatures between about 70° and 100° C. The extracted granular polyamides are then dissolved in dimethyl formamide and the polyamide powders are formed by cooling the solution.

7 Claims, No Drawings

METHOD FOR EXTRACTING GRANULAR POLYAMIDES AND FOR PREPARING POLYAMIDE POWDERS

CROSS REFERENCE TO RELATED APPLICATIONS

Applicants claim priorities under 35 U.S.C. 119 for Applications P24 34 755.5 and P 24 34 756.6, both filed July 19, 1974 in the Patent Office of the Federal Republic of Germany.

The disclosure of assignee's copending Application Ser. No. 354,072, filed Apr. 24, 1973 in the U.S. Pat. Office now U.S. Pat. No. 3,927,141 is incorporated herein to show the state of the art of preparing polyamide powders.

BACKGROUND OF THE INVENTION

The field of the invention is polyamide powders.

The state of the prior art of producing and using polyamide powders and the polyamide raw materials may be ascertained by reference to U.S. Pat. Nos. 2,698,966; 2,742,440; and 2,975,126 of Louis L. Stott; U.S. Pat. No. 3,203,822 of Junker et al; U.S. Pat. Nos. 3,410,832 of Griehl et al; 3,299,009 of Stephen D. Bruck; East German Pat. No. 8027 of Hermann Wenderoth, dated May 27, 1953 and the Kirk-Othmer "Encyclopedia of Chemical Technology," 2nd Ed., Vol. 16 (1968), under the section "Polyamide (Plastics)," pages 88–105, particularly page 92- Polylauryllactam (nylon-12), and polyundecanamide (nylon-11), page 101 Solution Processes and Powder Processing, pages 101–102, the disclosures of which are incorporated herein.

U.S. Pat. No. 2,698,966 discloses physical mixtures of different types of nylon powders produced by dissolving the nylon in organic solvents and precipitating the powdered particles. In Example 14 of U.S. Pat. No. 2,742,440, the solution of epsilon caprolactam polymer in alcohol-water solution and its precipitation as a powder is disclosed. The dispersion of Teflon powder in a solution of epsilon caprolactam polymer and the coprecipitation of the powders is disclosed in U.S. Pat. No. 2,975,128.

The flame spraying and fluidized bed coating of nylon on a metal base is disclosed in U.S. Pat. No. 3,203,822. U.S. Pat. No. 3,299,009 discloses the n-methoxymethylation of nylons, and U.S. Pat. No. 3,410,832 discloses the preparation of polymers and copolymers of lauryllactam.

It is old in the art to prepare polyamide powders by precipitating polyamides from solutions as disclosed in German Pat. Application S 2805 39b-22/04 laid open to inspection Oct. 5, 1951 and corresponding to British Pat. No. 688,771 and French Pat. No. 989,062. It is also known to use dimethyl formamide as a solvent as disclosed in East German Pat. No. 8027. Conventionally, the granular polyamides are subjected to extraction prior to further processing, in order to remove the monomerous and low molecular ingredients.

SUMMARY OF THE INVENTION

Having in mind the limitations of the prior art, it is an object of the present invention to provide an improved method of extracting granular polyamides.

Another object of the present invention is to provide a powdered polyamide made from a solution of the extracted granular polyamides.

It has been found that granular polyamides having at least 10 aliphatically bound carbon atoms per carbonamide group or copolyamides containing at least 70 percent by weight of such polyamide constituents are selectively extracted, provided the extraction is carried out at temperatures between about 70° and 100° C and by means of dimethyl formamide.

It is known that polyamides which are processed into shaped bodies or fibers are treated in granular form with extraction means in order to remove monomers or low molecular components. Practically, water or low molecular alcohols having 1 to 4 carbon atoms and also benzol and toluol are used as extracting means. Generally therefore those substances are used as extracting means which dissolve the monomers or low molecular components, but do not dissolve the polyamide itself. Furthermore, the extraction means causes no alteration in the property profile of the polyamide, such as yellowing or a lessening of mechanical qualities.

As pointed out above, it is known how to completely dissolve the polyamide in the preparation of powdered polyamides at high temperatures, and how to obtain the polyamide powder therefrom by precipitation or cooling. However, such a process results in higher molecular components also remaining in the solvent besides the monomers and low molecular ones, so that such powders differ in their property profiles from the polyamides obtained by conventional extraction. Among other solvents, dimethyl formamide is known as a solvent for such a process as disclosed in East German Pat. No. 8027.

The extraction is a relatively long process because the extracted granular polyamides must be freed of the extracting means, then dried and again dissolved in another solvent for the preparation of a powder. A grinding process is of no help in this respect because it does not lead to powder polyamides which are useful in every application.

Surprisingly, the monomers and low molecular components are selectively dissolved and the mechanical properties of the polyamide are not disadvantageously modified in the process of the present invention. Furthermore, for comparable amounts of solvents, the extraction takes place in appreciably shorter time. Because of the especially selective dissolving power of dimethyl formamide with respect to the monomers and low molecular components of the polyamide, lesser amounts of extraction means are used when the temperature is suitably selected.

The task of preparing powdered polyamides having at least 10 aliphatically bound carbon atoms per carbonamide group or copolyamides containing at least 70 percent by weight of such polyamide constituents is achieved by cooling a solution of dimethyl formamide containing the polyamides.

The drawbacks of the state of the art are simply overcome, especially as regards the long extraction times, when the solution used for preparing the powered polyamides is used in conjunction with the granular polyamides obtained by extracting with dimethyl formamide at temperatures between about 70° and 100° C.

DESCRIPTION OF THE PREFERRED EMBODIMENTS

Suitable polyamides are homopolyamides such as polyundecanoic acid amide, polylauryllactam or polyamides with more than 11 aliphatically bound carbon atoms per carbonamide group, especially polylauryllactam. Polylauryllactam for instance has 11 aliphatically bound carbon atoms per carbonamide group. Mixed polyamides also are understood among these, when they contain at least 70 percent by weight of the above cited constituents of the homopolyamides, especially if the weight is at least 80 percent. Caprolactam and/or capryllactam and/or the salt of hexamethylene diamine and adipic acid and/or the salt of hexamethylene diamine and sebacic acid and/or the salt of hexamethylene diamine and dodecanoic acid, the salt of hexamethylene diamine and terephthalic acid or isophthalic acid are also used as comonomers in amounts of up to 30, especially to 20 percent by weight. Furthermore, hexamethylene diamine may be wholly or partly replaced with branched chain diamine such as isophorone diamine or trimethylhexamethylene diamine.

The average particle diameters of the granular polyamides used appropriately are from about 1 to 4 mm, preferably 2 to 3 mm. Such granular polyamides are technically termed chips.

The extraction process is carried out at temperatures between about 70° and 100° C, preferably between about 80° and 90° C. When copolyamides are used, one suitably operates in the lower temperature range of about 70° to 90° C and for homopolyamides, the temperatures are preferably above 80° C.

The amount of dimethyl formamide used is generally from the same weight as the polyamide used up to 10-fold of the weight of the polyamide, preferably from twice to 5-fold, and especially twice to 3 fold. Naturally, larger amounts are used at lower temperatures, and lesser amounts at higher temperatures.

Following extraction, and separation of the extracts, the granulate is conventionally dried at temperatures between about 70° and 100° C, preferably between 80° and 90° C. The adhering and entrained dimethyl formamide is appropriately removed under reduced pressure prior to and during drying. The process has the advantage of achieving treated polyamides containing lesser amounts of extractable ingredients.

According to another method, the granulate extracted by means of dimethyl formamide is treated with methanol in order to ensure the achievable low extract content without having to deal with the minute amounts of dimethyl formamide present.

Besides achieving very low contents of extract, this additional measure furthermore allows shortening the extraction cycle with respect to using methanol alone. Methanol treatment takes place at temperatures between about 50° and 65° C, preferably between 60° and 65° C. In any case, excellent granulates are achieved even without this post-treatment by means of methanol, such granulates being very useful in manufacturing foils and films.

Following extraction, the granulate is placed into a second container, appropriately a stirring vessel, where it is dissolved in dimethyl formamide at temperatures between about 140° and 150° C. Generally twice to triple of the amount by weight of solvent based on the weight of the polyamide is used to dissolve the polyamide.

The polyamide is obtained in powdered form by cooling this hot solution.

The precipitated polyamide powder is appropriately freed from solvent residues under reduced pressure and dried. When necessary, this polyamide is adjusted to the desired grain size by grinding and sifting.

With regard to the conventional methanol extraction, the extracted, precipitated granulate requires drying and ensuing renewed dissolution for powder preparation. The process of the present invention, on the other hand, holds the special advantage that the precipitated, moist granulate obtained from extraction, and generally having a moisture content of about 5 to 20, preferably from about 5 to 10 percent by weight, may be dissolved without requiring intermediate drying. Further, the polyamide granulates of the present invention used for powder preparation are characterized by a much lower extract content.

Further advantages of the present invention are apparent from the following specific examples:

The granular polyamides useful in the specific examples of the present invention have 10 to 15 aliphatically bound carbon atoms per carbonamide group preferably 10 to 12 of said carbon atoms, and especially 11 of said carbon atoms.

In the dimethyl formamide extraction step of the granular polyamides at the temperature range of 70° to 100° C, the concentration of granular polyamides is about 1 part to 10 parts by weight dimethyl formamide to 1 part by weight granular polyamides preferably about 2 parts to 5 parts by weight dimethyl formamide to 1 part by weight granular polyamides, and especially 2 parts to 3 parts by weight dimethyl formamide to 1 part by weight granular polyamides.

The time of extraction of the granular polyamides with dimethyl formamide at 70° to 100° C is 5 to 10 hours and preferably 6 to 8 hours.

In the post-extraction step with methanol, the useful temperature range is about 60° to 65° C, the time of extraction is about 2 to 5 hours preferably 3 to 4 hours and the concentration is about 2 to 5 parts by weight methanol to 1 part of granular polyamides.

The dimethyl formamide solution step of the extracted granular polyamides is carried out at a temperature of about 130° to 150° C, preferably 140° to 145° C, the concentration is about 1 to 4 parts by weight dimethyl formamide to 1 part of extracted granular polyamides and preferably 2 to 3 parts by weight, and the time for bringing about solution is about 1 to 6 hours and preferably 3 to 5 hours.

Excellent powders are achieved which are very useful in the fluidized bed sintering process.

EXAMPLE 1

Granular polylauryllactam of a grain size of about 2 - 3 mm in diameter is treated in a tumbling drier at 90° C with twice the amount by weight of dimethyl formamide. The extract is removed after 8 hours, the granulate is washed with a single amount by weight of fresh dimethyl formamide and dried at a temperature of 90° C and a pressure of 50 Torr (mm $H_g$). The single extraction reduces the proportion of extractable substance from 1.2 to 0.3 percent by weight.

If, on the other hand, a double amount of weight of methanol is used at 65 ° C, the extraction process must be carried out twice. It will then last 10 hours. The proportion of extractable substances then drops merely from 1.2 to 0.5 percent.

EXAMPLE 2

In lieu of polylauryllactam, a mixed polymer consisting of 80 percent by weight of lauryllactam and 20 percent by weight of caprolactam is treated at 85° C with dimethyl formamide under the conditions of Example 1. The grain size of the mixed polyamide used amounts to 2 - 3 mm. After 6 hours, the extractible proportion has dropped from 1.8 to the constant value of 0.35 percent by weight.

EXAMPLE 3

Polylauryllactam of a grain size of 2 - 3 mm and with an extractible porportion of low molecular substances of 1.2 percent by weight is treated with twice the amount by weight of dimethyl formamide at 90° C for 6 hours in a tumbling drier. Upon removing the extract, the moist granulate is extracted by means of twice the amount by weight of methanol. Treatment takes place at 65° C for a length of 3 hours. The dried granulate contains less than 0.3 percent by weight of extractible components.

EXAMPLE 4

Granular polylauryllactam of a grain size of 2 - 3 mm in diameter and treated at 90° C with twice the amount by weight of dimethyl formamide for 8 hours, is dissolved without intermediary drying in moist form (about 6 percent by weight of moisture content), immediately in twice the amount by weight of dimethyl formamide at 140°-145° C. The solution obtained is cooled to room temperature and the powder obtained is freed from the solvent under reduced pressure, and dried. The extract content of the granulate used for powder preparation is 0.3 percent by weight.

When methanol is used as extracting means, the granular polyamide must be extracted twice, at least 10 hours being required. Furthermore, the extracted granulate must be dried for about 15 hours before it may be subjected to the dissolution process for powder preparation. The extract content of the extracted granulate used for powder preparation was 0.5 percent by weight.

Besides the low extract content of the powder obtained by the process of the present invention, the latter holds the advantage of lesser process time, that is, only 8 hours of pre-treatment rather than 20 hours when using methanol as the extracting means.

EXAMPLE 5

A mixed polymer consisting of 80 percent by weight of lauryllactam and 20 percent by weight of caprolactam is used in lieu of polylauryllactam for the preparation of the powder, and dissolved according to Example 4. Recovery of the precipitated powder is carried out as in Example 4. The mixed polymer was extracted at 85° C for 6 hours with dimethyl formamide and its extract content amounts to 0.35 percent by weight and the grain size of the granulate was 2 to 3 mm.

We claim:

1. A method for preparing powdered polycarbonamide having at least 10 aliphatically bound carbon atoms per carbonamide group or mixed polycarbonamide containing at least 70 percent by weight of said polycarbonamide as constituents consisting of essentially:
   a. extracting said polycarbonamide in granular form with dimethyl formamide at a temperature of about 70° to 100° C, to remove the monomerous and low molecular ingredients;
   b. separating the extracted polycarbonamide in granular form from the dimethyl formamide residue;
   c. dissolving the separated and extracted polycarbonamide in dimethyl formamide at a temperature between about 140° and 150° C to form a solution; and
   d. precipitating said powdered polycarbonamide by cooling said solution.

2. The method of claim 1, wherein said mixed polycarbonamide has at least 80 percent by weight of said polycarbonamide.

3. The method of claim 1, wherein said extraction is carried out at temperatures between about 80° and 90° C.

4. The method of claim 1, wherein said extracted granular polycarbonamide are further treated with methanol.

5. The method of claim 1, wherein the concentration in step (a) is one part to 10 parts by weight dimethyl formamide to one part by weight polycarbonamide.

6. The method of claim 5, wherein the concentration in step (c) is two parts to three parts by weight dimethyl formamide to one part by weight polycarbonamide.

7. The method of claim 6, wherein the separated and extracted polycarbonamide has a moisture content of about 5 to 20 percent by weight.

* * * * *